US 6,611,115 B2

(12) United States Patent
Wakashiro et al.

(10) Patent No.: US 6,611,115 B2
(45) Date of Patent: Aug. 26, 2003

(54) CONTROL DEVICE FOR HYBRID VEHICLES (75) Inventors: Teruo Wakashiro, Wako (JP); Atsushi Izumiura, Wako (JP); Atsushi Matsubara, Wako (JP); Hideyuki Oki, Wako (JP); Shinichi Kitajima, Wako (JP); Yasuo Nakamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/851,945

(22) Filed: May 10, 2001

(65) Prior Publication Data
US 2001/0040437 A1 Nov. 15, 2001

(30) Foreign Application Priority Data
May 12, 2000 (JP) .......................................... 2000-140985

(51) Int. Cl.$^7$ ............................... H02P 5/00; B60K 6/00
(52) U.S. Cl. ...................... 318/139; 318/140; 180/65.1; 180/65.2; 180/65.3
(58) Field of Search ..................... 318/139, 376, 318/743, 140; 180/65.1, 65.2, 65.3, 65.4, 65.6, 65.7, 65.8; 320/101, 166

(56) References Cited
U.S. PATENT DOCUMENTS
3,579,064 A * 5/1971 Taylor ......................... 318/742

5,713,426 A * 2/1998 Okamura .................... 180/65.3
5,714,851 A * 2/1998 Antony et al. ............... 318/148
6,020,697 A * 2/2000 Shimasaki et al. .......... 180/65.4
6,114,775 A * 9/2000 Chung et al. ................ 318/139
6,116,368 A * 9/2000 Lyons et al. ................. 180/165
6,124,690 A * 9/2000 Yano et al. .................. 318/376
6,223,106 B1 * 4/2001 Yano et al. .................. 180/65.2
6,333,612 B1 * 12/2001 Suzuki et al. ............... 180/65.2
6,414,453 B1 * 7/2002 Tamagawa et al. .......... 318/139
6,422,331 B1 * 7/2002 Ochiai et al. ................ 180/65.2
6,523,626 B2 * 2/2003 Wakashiro et al. .......... 180/65.2

* cited by examiner

Primary Examiner—Robert E. Nappi
Assistant Examiner—Eduardo Colon-Santana
(74) Attorney, Agent, or Firm—Armstrong, Westerman & Hattori, LLP (57) ABSTRACT In order to effectively prevent generation of a counter electromotive voltage during cruising, the present invention provides a control system of a hybrid vehicle comprising an engine, motor, and a capacitor, including an engine rotational speed sensor for detecting the engine rotational speed NE, a target voltage setting device for setting a charge target voltage (target capacitor voltage), and a motor ECU for controlling the charge of said power storage unit. A target capacitor voltage VCAPCMD is set based on the detected engine rotational speed NE (step S300), and when the capacitor voltage VCAP<the target capacitor voltage VCAPCMD (step S311 is "YES"), a charging operation is executed until the target capacitor voltage VCAPCMD≦the capacitor voltage VCAP. Thereby, it is possible to maintain the counter electromotive voltage<the capacitor voltage.

3 Claims, 12 Drawing Sheets

CONTROL DEVICE FOR HYBRID VEHICLES

BACKGROUND OF THE INVENTION

1. Field of the Invention

The present invention relates to a control system for a hybrid vehicle, and in particular, to a technique that is effective for preventing generation of a counter electromotive voltage in a motor during cruising.

2. Description of the Related Art

Conventionally, hybrid vehicles which carry motors as power sources for driving vehicles in addition to engines are known. Hybrid vehicles are divided into series hybrid vehicles and parallel hybrid vehicles. In parallel hybrid vehicles, the motor connected to the engine assists the rotation of the drive shaft of the engine while charging a battery using a generator, which is the motor itself.

In parallel hybrid vehicles, a variety of control operations are executed so that the motor assists the engine at the time of acceleration and a battery is charged by deceleration regeneration at the time of deceleration, in order to maintain the residual capacity of the battery constant and to respond to the driver's demands.

Japanese Unexamined Patent Application, First Publication No. Hei 7-123509, for example, discloses a hybrid vehicle which controls power generation by the motor, when the sum total of electric power obtainable by regeneration, which is estimated from the present driving state, and the present remaining charge of the power storage unit is smaller than a predetermined standard charge.

This hybrid vehicle has an advantage in that the loss of regenerative power or degradation of the fuel consumption due to excess power generation can be prevented by optimizing the target charge of the power storage unit based on parameters such as the vehicle speed correlated with the kinetic energy.

However, as the vehicle speed increases, the kinetic energy of the vehicle increases and the electric power obtained by regeneration increases, so that the battery charge at the time of cruising must have the capacity to absorb the excess charge.

However, the motor used for the hybrid vehicles or the like generally generates a counter electromotive voltage in response to the number of rotations. Thus, if this counter electromotive voltage is higher than the voltage of the power storage unit, a current flows from the motor to the power storage unit. Therefore, it becomes necessary to perform switching control by a power drive unit in order to protect the power storage unit from the excess voltage.

On the other hand, the switching control of the counter electromotive voltage causes the generated power by the motor to be dissipated as heat and a load is applied to the engine due to power generation friction.

In particular, the above problem becomes remarkable when a capacitor is used, because it has a comparatively small energy capacity and its voltage decreases as the energy decreases, in contrast to a battery, which has a large energy capacity and a stable voltage.

SUMMARY OF THE INVENTION

The present invention was made to solve the above problems and the object of the present invention is to efficiently prevent generation of the counter electromotive voltage by the motor at the time of cruising.

The first aspect of the present invention provides a control system for a hybrid vehicle with an engine and a motor, which are power sources, and a power storage unit for supplying electric power to the motor and for storing the electric power by regeneration, comprising: a rotational number detecting device for detecting the rotational number associated with said motor, a target voltage setting device for setting the charge target voltage of said power storage unit in response to the output of said rotational number detecting device, and a charge control device for controlling the charge of said power storage unit, wherein said charge control device controls the charge of said power storage unit such that the charge of said power storage unit reaches said charge target voltage when the voltage of said power storage unit is below said charge target voltage.

By constituting the control system of the hybrid vehicle as shown above, when the present voltage of the power storage unit<target charge voltage, the control system carries out an immediate charging operation of the power storage unit. Thus, the relationship of the present voltage of the power storage unit<the counter motor electromotive voltage can be maintained most of the time. Accordingly, it is possible to obtain a high fuel efficiency.

According to the second aspect of the present invention, in the above control system of a hybrid vehicle, said motor is disposed on the same driving shaft connecting said engine with the driving wheels for producing an assist driving force to assist the output from said engine or for producing energy by regeneration in response to the driving state of said vehicle and the charge state of said power storage unit, and, when the vehicle is in a charge mode, in which, when said vehicle does not require the assistance of the driving power by said motor, the control system operates said motor as a power generator for charging said power storage unit, said charge control device controls the charge of said power storage unit such that the charge of said power storage unit reaches said charge target voltage.

By constituting the control system as described above, because the voltage of the power storage unit is maintained above the voltage of the counter electromotive voltage, and the unnecessary loads on the engine due to adjusting the counter electromotive voltage can be eliminated, the degradation of the fuel consumption by application of the load to the engine can be avoided.

According to the third aspect of the present invention, in the above control system of a hybrid vehicle, said power storage unit is constituted by a capacitor comprising an electric double layer capacitor.

By constituting the control system of a hybrid vehicle as described above, the power storage unit of the present invention does not have to use device such as a battery, which is dependent on the chemical reactions and the response characteristics of the present invention are improved.

DETAILED DESCRIPTION OF THE INVENTION

Hereinafter, a preferable embodiment of the present invention is described with reference to the attached drawings.

Figure 1:
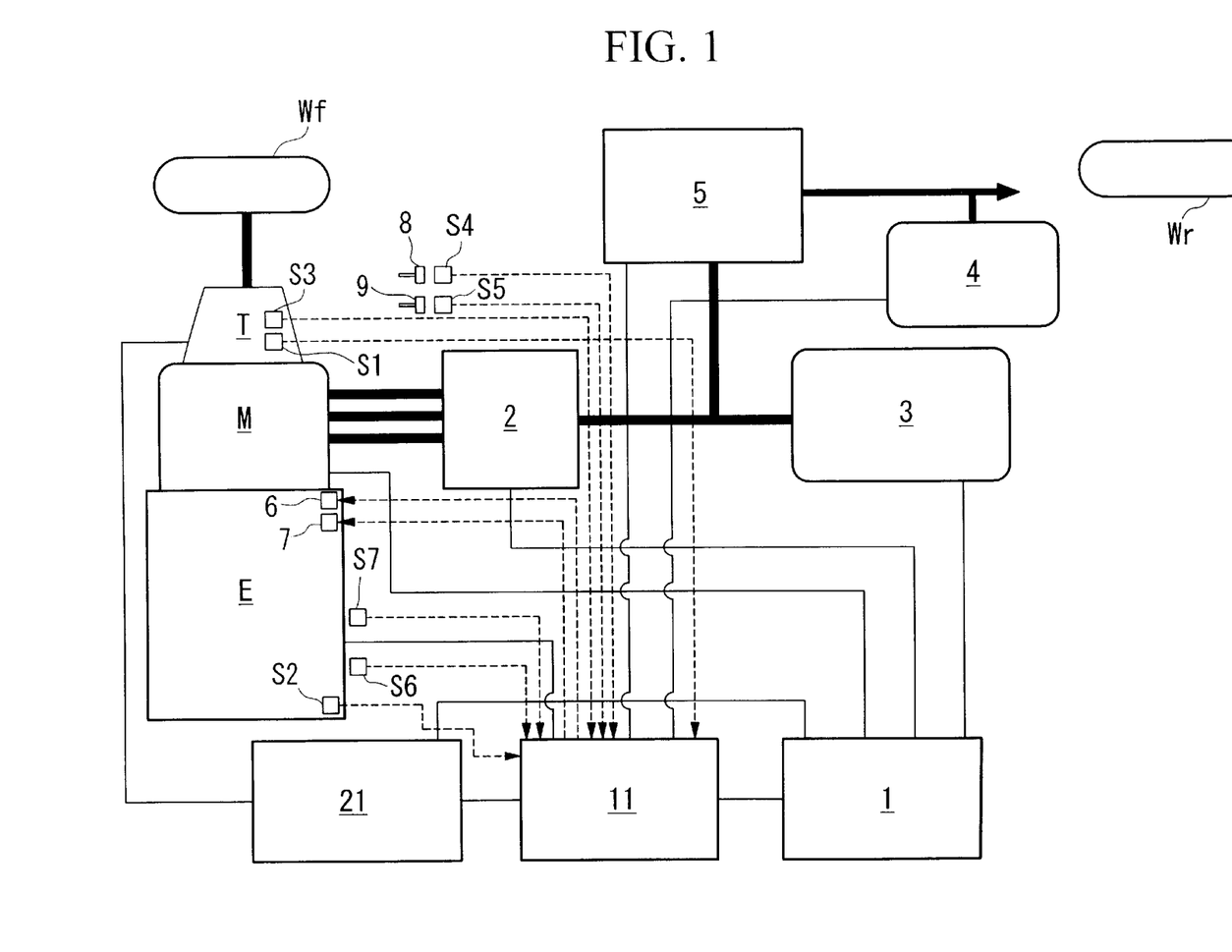
FIG. 1 is a schematic diagram showing the over-all structure of the hybrid vehicle of the present invention.

FIG. 1 shows a parallel hybrid vehicle in which the output axes of the engine and the motor are directly connected without an intervening clutch. The driving forces from an engine E and a motor M are transmitted through a transmission T, such as an automatic transmission or a manual transmission, to the front wheels Wf and Wf, which are the drive wheels. When the hybrid vehicle decelerates and the driving force is transmitted from the front wheels Wf to the motor M, the motor acts as a generator to generate regenerative braking force, so that the kinetic energy of the vehicle body is stored as electric energy. That is, the motor M is coupled on a driving axle connecting the engine E and the front wheels Wf and Wf, and the motor M assists the driving power or executes regeneration in response to the driving state of the vehicle and the capacitor voltage VCAP. Here, Wr denotes a rear wheel.

The driving and regeneration by the motor M are conducted by a power drive unit 2 according to control commands from a motor ECU 1 (charge control device). A high voltage capacitor (power storage unit) 3 for sending and receiving electric energy to and from the motor M is connected to the power drive unit 2, and the capacitor 3 is constituted by, for example, an electric double layer capacitor. The hybrid vehicle includes a 12 V auxiliary battery 4 for driving various accessories. The auxiliary battery 4 is connected to the battery 3 via a downverter 5. The downverter 5, controlled by an FIEDU 1, reduces the voltage from the battery 3 and charges the auxiliary battery 4.

The motor ECU 1 in addition to protecting the capacitor 3, determines whether the capacitor voltage VCAP is larger or smaller than a target capacitor voltage (target charge voltage) VCAPCMD, which is described later, an enforced power generation execution capacitor voltage VCAPL, and a normal power generation mode execution upper limit capacitor voltage VCAPH. The motor ECU 1 outputs a control command in response to the above determination to the power drive unit.

The FIECU 11 controls, in addition to the motor ECU 1 and the above-described downverter 5, a fuel supply amount controller 6 for controlling the amount of fuel supplied to the engine E, a starter motor 7, an ignition timing etc. Therefore, the FIECU 11 receives a signal from a speed sensor $S_1$ for detecting the vehicle speed V based on the rotation number of the driving shaft of the transmission, a signal from an engine rotational speed sensor (rotational speed detecting device) $S_2$ for detecting the engine rotational speed NE, a signal from a shift position sensor $S_3$ for detecting the shift position of the transmission T, a signal from a brake switch $S_4$ for detecting the operation of a brake pedal 8, a signal from a clutch switch $S_5$ for detecting the operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 21 denotes a CVTECU for controlling a CVT.

[Determination of Motor Operation Mode]

The control modes of the hybrid vehicle are "idle mode", "idle stop mode", "deceleration mode", "acceleration mode", and "cruise mode". In the idle mode, the fuel supply is restarted after the fuel cut and the engine E is maintained in the idle state, and in the fuel cut mode, the engine is stopped under certain conditions while, for example, the vehicle is stopped. In the deceleration mode, the regenerative braking by the motor M is executed, in the acceleration mode, the engine is assisted by the motor M, and in the cruise mode, the vehicle travels by the engine and the motor M is not driven.

Figure 2:
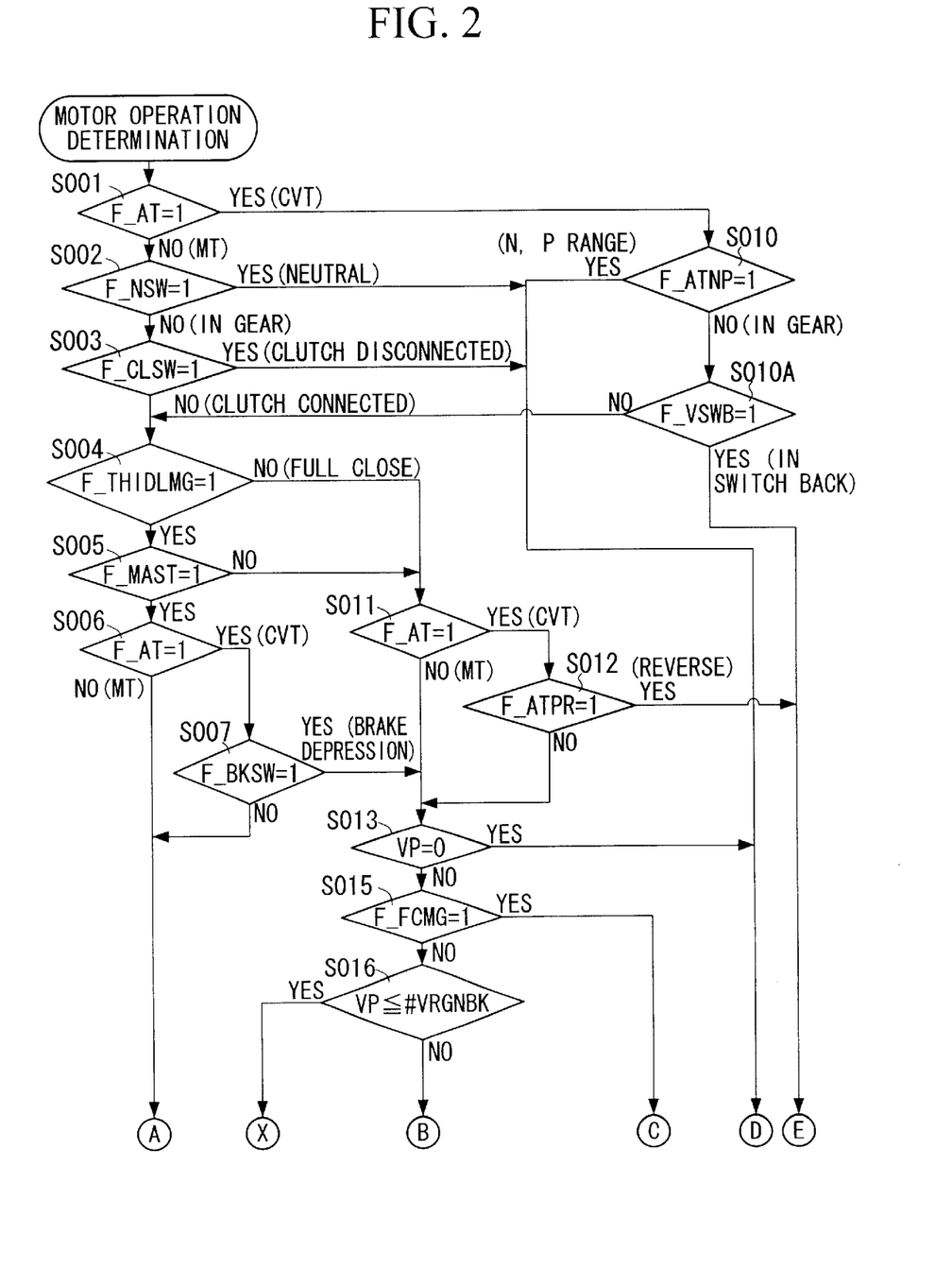
FIG. 2 is a flowchart showing a determination of the motor operation mode of the present invention.
Figure 3:
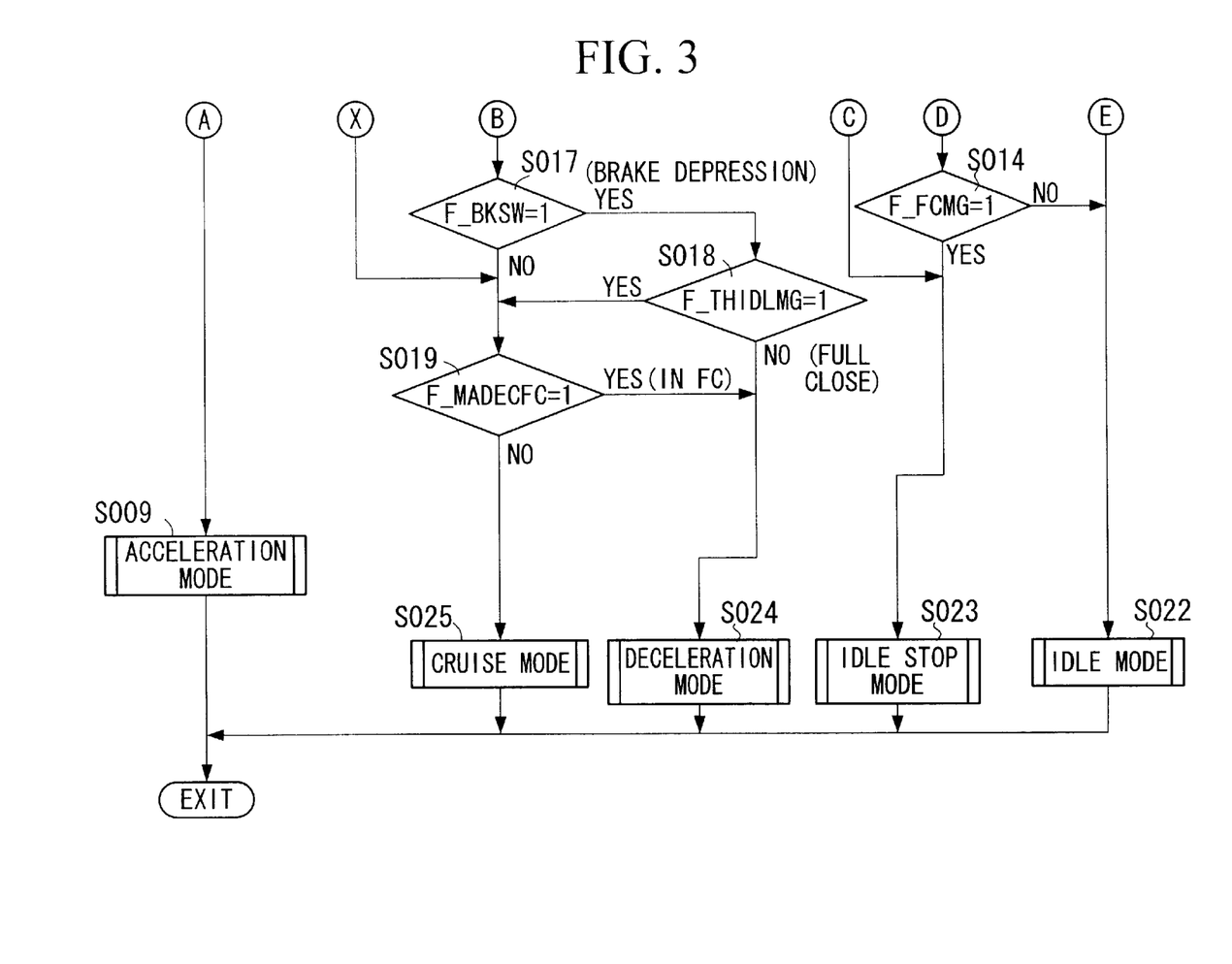
FIG. 3 is a flowchart showing a determination of the motor operation mode of the present invention.

The process for determining a motor operation mode is described below with reference to FIGS. 2 and 3.

In step S001, it is determined whether the flag value of a MT/CVT determination flag F_AT is "1". If the determination is "NO", that is, if it is determined that the vehicle is a MT vehicle, the flow proceeds to step S002. When the determination in Step S001 is "YES", that is, when it is determined that the vehicle is a CVT vehicle, the flow proceeds to step S010, wherein it is determined whether the flag value of a CVT in-gear flag F_ATNP is "1". If the determination in step S010 is "NO", that is, if it is determined that the vehicle is an in-gear state, the flow proceeds to step S010A, wherein it is determined whether the vehicle is in the switch back state by determining the state of a switch back flag F_VSWB. When the result of the determination shows that the motor is in switch back operation, the flow proceeds to step S022, wherein the "idle mode" is selected and the program is completed. In the "idle mode", the fuel supply is restarted after the fuel cut, and the engine E is maintained in the idle state. When the determination in step S010A indicates that the vehicle is not in the switch back state, the flow proceeds to step S004.

In contrast, when the determination in step S010 is "YES", that is, when the transmission is in a position including N (neutral position) or P (parking position), then the flow proceeds to step S014, wherein it is determined whether an engine stop control execution flag F_FCMG is "1". When the result in step S104 is "NO", then the "idle mode" in step S022 is selected and the program is completed. When it is determined that the flag value in Step S014 is "1", the flow proceeds to step S023, and the program is completed. In the "idle stop mode" the engine is stopped when certain conditions such as the vehicle stop are fulfilled.

In step S002, it is determined whether the neutral position determination flag F_NSW is "1". When the determination in step S002 is "YES", that is, the gear is in the neutral position, the flow proceeds to step S014. If the result in step S002 is "NO", that is, the gear is in the neutral position, the flow proceeds to step S003, wherein it is determined whether a clutch connection determination flag F_CLSW is "1". When the result is "YES" indicating it is determined that the clutch is in the "disconnection" state, the flow proceeds to step S 014. When the determination in step S003 is "NO", showing that the clutch is in the "connection state", and the flow proceeds to step S004.

In step S004, it is determined whether the IDLE determination flag F_THIDLMG is "1". If the result is "NO", that is, it is determined that the throttle is full open, and the flow proceeds to step S011. When the result in step S004 is "YES", that is, when it is determined that the throttle is not fully opened, the flow proceeds to step S005, wherein it is determined whether the motor assist assist determination flag F_MAST is "1".

If the determination in step S005 is "NO", the flow proceeds to step S011. When the determination in step S 005 is "YES", the flow proceeds to step S006.

In step S011, it is determined whether MT/CVT determination flag F_AT is "1". If the result is "NO", that is when it is determined that the vehicle is a MT vehicle, the flow proceeds to step S013. When the determination in step S011 is "YES", that is, when it is determined that the vehicle is a CVT vehicle, the flow proceeds to step S012, wherein, it is determined whether the reverse position determination flag F_ATPR is "1". If the determination is "YES", that is, the vehicle is in the reverse position, the flow proceeds to step S 022. If the determination in step 012 is "NO", that is the vehicle is not in the reverse position, the flow proceeds to step S013.

In step S006, it is determined whether the MT/CVT determination flag F_AT is "1". If the result is "NO", that is, it is determined that the vehicle is a MT vehicle, the flow proceeds to the "acceleration mode" in step S009.

When the determination in step S006 is "YES", which indicates that the vehicle is a CVT vehicle, the flow proceeds to step S007, wherein it is determined whether the brake ON determination flag F_BKSW is "1". When the determination in step S007 is "YES", indicating that the brake is depressed, the flow proceeds to step S013. When the determination in step S007 is "NO", indicating that the brake is not depressed, the flow proceeds to step S009.

IN step S013, it is determined whether the engine control vehicle speed is "0". If the result is "YES", indicating that the vehicle speed is 0, the flow proceeds to step S014. If the determination in step S013 is "NO", indicating that the vehicle speed is not 0, the flow proceeds to step S015. In step S015, it is determined whether the engine stop control execution flag F_FCMG is "1". When the result of the determination in step S015 is "NO", then the flow proceeds to step S016. When the result of the determination in step S015 is "YES", then the flow proceeds to step S023.

In step S016, the control vehicle speed VP is compared with the deceleration mode brake determination lower limit vehicle speed #VRGNBK. It is noted that this deceleration mode brake determination lower limit vehicle speed #VRGNBK has a hysteresis.

When it is determined in step S016 that the control vehicle speed VP≦the deceleration mode brake determination lower limit vehicle speed #VRGNBK, the flow proceeds to step S019. In contrast, when it is determined that the control vehicle speed VP>the deceleration mode brake determination lower limit vehicle speed #VRGNBK, the flow proceeds to step S017.

In step S017, it is determined whether the brake ON determination flag F_BHSW is "1". When the determination in step S017 is "YES", indicating that the brake is being depressed, the flow proceeds to step S018. When the determination instep S017 is "NO", indicating that the brake is not being depressed, the flow proceeds to step S019.

In step S019, it is determined whether a deceleration fuel cut execution flag F_MADECFC is "1". This flag is, as described later, a fuel cut determination flag for executing a fuel cut in a particular mode in the high vehicle speed region.

When the determination in step S019 is "YES", that is, when it is determined that the vehicle is in a deceleration fuel cut state, the flow proceeds to step S024. When the determination in step S019 is "NO", the "cruise mode" is selected in step S025 and the control flow is completed. In this cruise mode, the motor does not drive the vehicle and only the driving force of the engine E drives the vehicle. In some cases, however, the motor is rotated for regeneration or used as a power generator for charging the capacitor 3 according to the driving condition of the vehicle.

[Zoning of Capacitor Charge]

Explanations are provided below regarding the zoning of the capacitor charge (also referred to as dividing the capacitor charge into zones), which have a significant effect on the assist trigger determination or the cruise mode.

In this embodiment, because the capacitor charge is proportional to the square of the capacitor voltage VCAP, the capacitor charge is divided into three regions by use of a normal generation mode execution upper limit capacitor voltage VCAPH (for example, 160 V), which is determined for protecting the capacitor from overcharging, and a forced generation execution capacitor voltage VCAPL (for example, 80V), which is determined by the minimum operating voltage of a DC—DC converter for supplying 12 V.

That is, by the use of a first threshold value of the enforced generation execution capacitor voltage VCAPL and a second threshold value of normal generation mode execution upper limit capacitor voltage VCAPH, the capacitor charge is divided into three regions such as a first region defined as an over discharge region (VCAP<VCAPL), a second region defined as the normal working region (VCAPL≦VCAP≦VCAPH), and a third region defined as the overcharge region (VCAPH<VCAP).

[Assist Trigger Determination]

Figure 4:
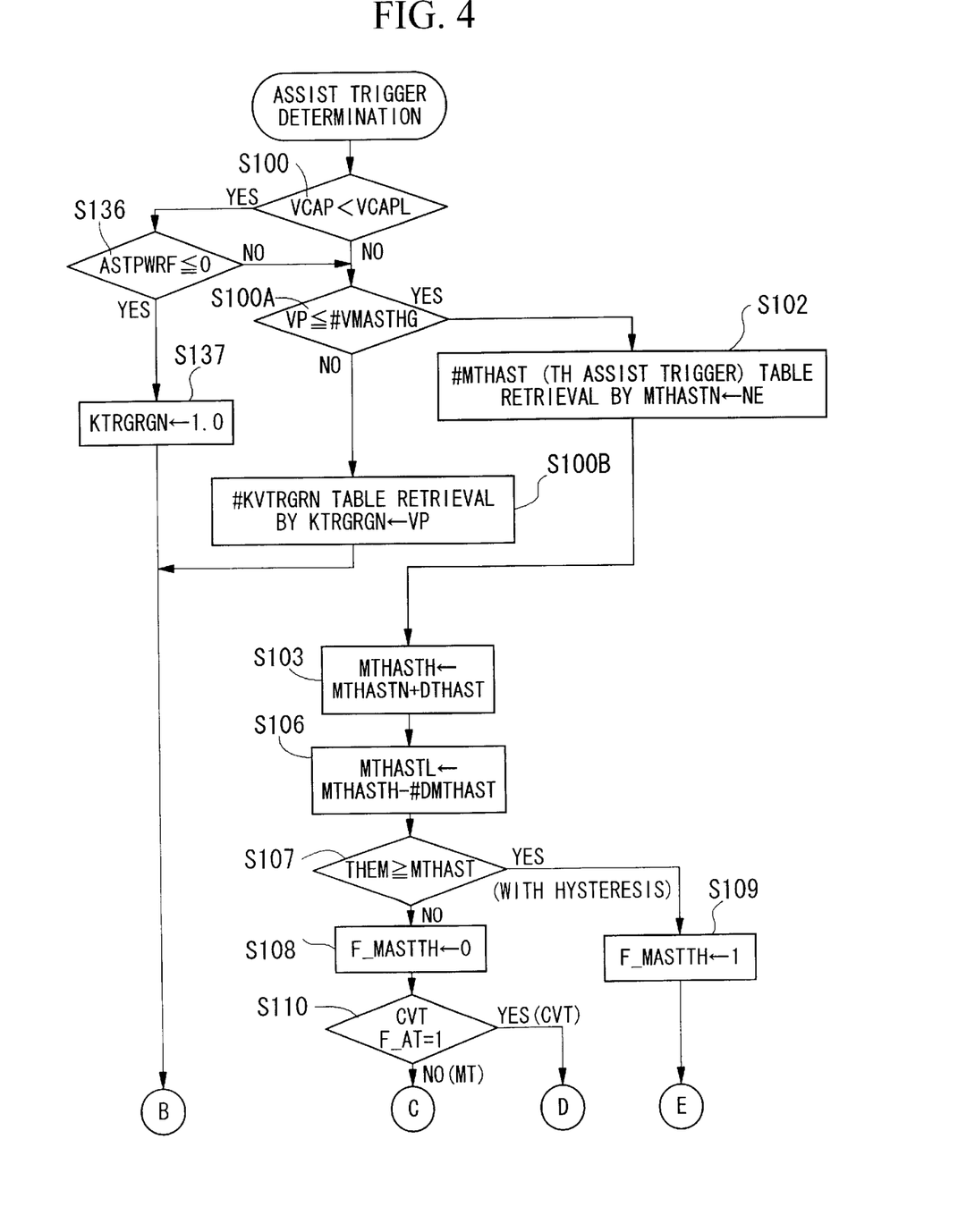
FIG. 4 is a flowchart showing the assist trigger determination of the present invention.
Figure 5:
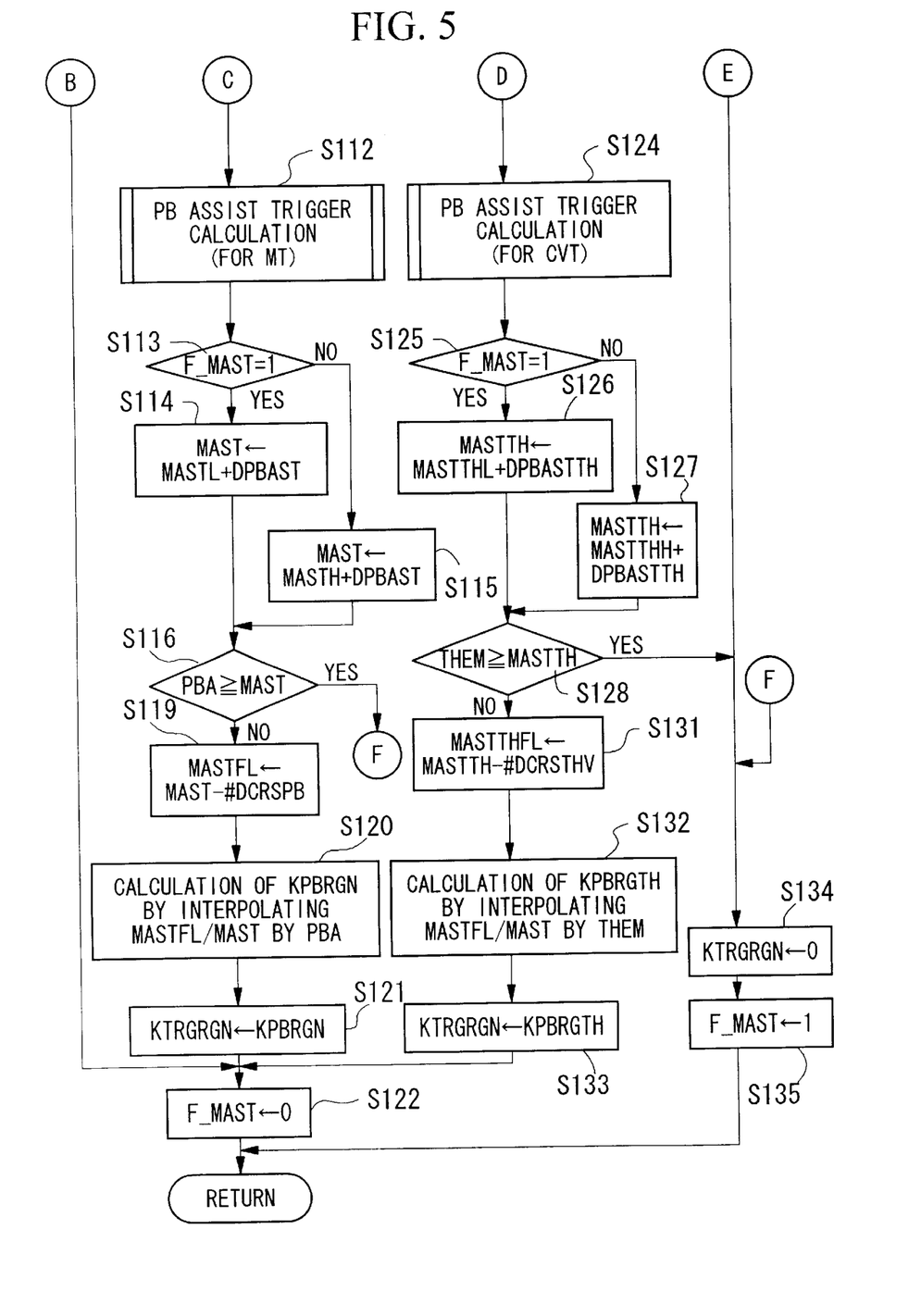
FIG. 5 is a flowchart showing the assist trigger determination of the present invention.
Figure 6:
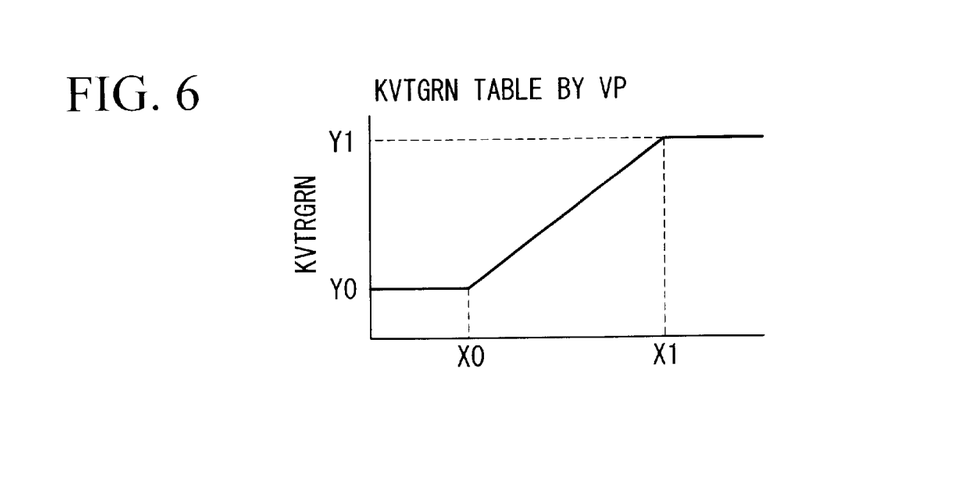
FIG. 6 shows a graph for determining the cruise charge amount correction coefficient in a high vehicle speed range in the present invention.
Figure 7:
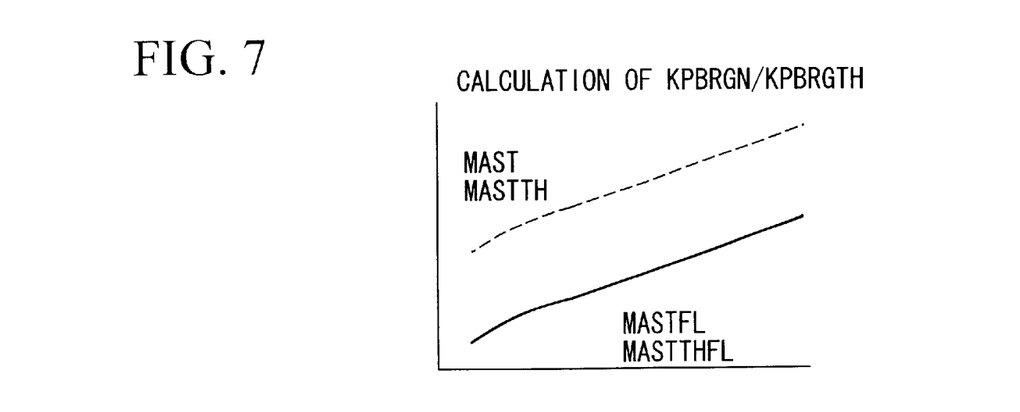
FIG. 7 is shows a graph for obtaining the numerical values in steps S119 and S131 of the present invention.

FIGS. 4 and 5 show flowcharts of the assist trigger determination, and in more detail, show flowcharts for determining the acceleration/cruise modes from the regions.

In step S100, it is determined whether the capacitor voltage VCAP is below the enforced generation execution capacitor voltage VCAPL. If the result is "YES", that is, when the capacitor charge is in the first region, it is determined in step S136 whether the final assist command value ASTPWRF is below 0. When the determination in step S136 is "YES", that is, the final assist command value ASTPWRF is below 0, a cruise charge amount subtraction coefficient KTRGRGN is set to "1.0", and the mode assist determination flag F_MAST is set to "0" in step S122 and then the flow returns.

When the determination in step S100 and the determination in step S136 are "NO", the flow proceeds to step S100A. In step S100A, the control vehicle speed VP is compared with an assist trigger retrieval upper limit vehicle speed #VMASTHG. It is noted that this value #VMASTHG has hysteresis.

When it is determined in step S100A that the control vehicle speed VP is less than the assist trigger retrieval upper limit vehicle speed #VMASTHG, the flow proceeds to step S102. Here, the assist trigger retrieval upper limit vehicle speed #VMASTHG is, for example, 170 km.

When it is determined in step S100A that the control vehicle speed Vp is larger than the assist trigger retrieval upper limit vehicle speed #VMASTHG, the flow proceeds to step S100B, wherein, based on the control vehicle speed VP, a cruise charging correction coefficient KTRGRGN is retrieved from the #KVTRGRN table. The flow then proceeds to step S122.

Figure 8:
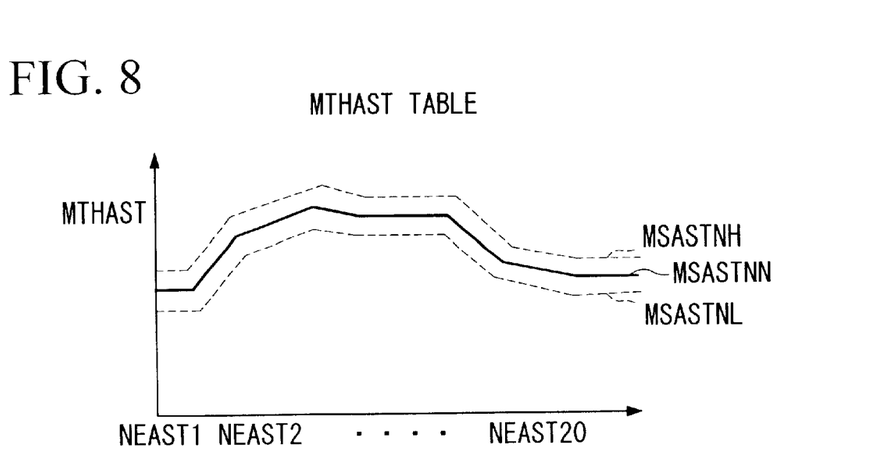
FIG. 8 is a graph showing the threshold values in the TH (throttle opening state) assist mode and in the PB (air intake passage pressure) assist mode of the present invention.

In step S102, a threshold value MTHASTN, which constitutes a standard for the throttle assist trigger, is retrieved from an #MTHAST throttle (assist trigger) table. As shown by the solid line in FIG. 8, this #MTHAST throttle (assist trigger) table defines the threshold values MTHASTN of the throttle opening state depending on the engine rotational speed NE. The threshold value MTHASTN is the standard for the determination of whether the motor assist is executed. That is, the threshold values are shown in accordance with the engine rotational speed NE.

Subsequently, in step S103, an upper throttle assist trigger threshold value MTHASTH is obtained by addition of a throttle assist trigger correction value DTHAST to the standard threshold value of the throttle assist trigger MTHASTN, and in step S106, a lower assist trigger assist trigger threshold MTHASTL is obtained by subtracting a difference #DMTHAST for setting the hysteresis from the high throttle assist trigger threshold value MTHASTH. These upper and lower throttle assist trigger threshold values are shown with the dashed lines in FIG. 8, overlapping the standard threshold value MTHASTN of the throttle assist trigger table. In step S107, it is determined whether the present value THEM indicating the opening state of throttle is equal to or above the throttle assist trigger threshold value MTHAST calculated in steps S 103 and S106. The throttle assist trigger value MTHAST, which includes the hysteresis mentioned above, refers to the upper throttle assist trigger threshold value MTHASTH when the opening of the throttle is increased, and refers to the lower throttle assist trigger threshold value MTHASTL when the opening of the throttle is decreased.

When in step S107 the determination is "YES", that is, when the present value THEM of the opening of the throttle is equal to or above the throttle assist trigger threshold value MTHAST (which has the upper and lower hysteresis), the flow proceeds to step S109. When in step S107 the determination is "NO", that is, when the present value THEM of the opening of the throttle is not equal to or above the throttle assist trigger threshold value THEM of the throttle assist trigger threshold value MTHAST (which has the upper and lower hysteresis), the flow proceeds to step S108.

In step S109, the throttle motor assist determination flag F_MASTTH is set to "1". In step S108, the throttle motor assist determination flag F_MASTTH is set to "0".

In the above process, it is determined whether the motor assist is required by the throttle opening state TH. When it is determined in step S107 that the present value THEM of the opening of the throttle is equal to or above the throttle assist trigger threshold value MTHAST, the throttle motor assist determination flag F_MASTTH is set to "1", and it is determined that the motor assist is required by reading the throttle motor assist determination flag in the "acceleration mode" mentioned above.

In contrast, in step S108, when the throttle motor assist determination flag F_MASTTH is set to "0", it is determined that the motor assist determination cannot be made by the opening of the throttle. As described above, the assist trigger determination is made in the present embodiment by the throttle opening state TH or by the air intake passage pressure PB. When the present value THEM of the opening of the throttle is equal to or above the throttle assist trigger threshold value MTHAST, the assist determination is made based on the throttle opening state TH, and when the present value THEM does not exceed the throttle assist trigger threshold value MTHAST, the determination is made based on the air intake passage pressure PB.

Subsequently, in step S109, after the throttle motor assist determination flag F_MASTTH is set to "1", the flow proceeds to step S134, separate from the normal assist determination flow. In step S134, the cruise charge amount subtraction coefficient KTRGRGN is set to "0", and in the subsequent step S135, the motor assist determination flag F_MAST is set to "1" and the flow returns.

In step S110, it is determined whether the MT/CVT determination flag F_AT is "1". When the determination is "NO", that is, when it is determined that the vehicle is a MT vehicle, the flow proceeds to step S112. When the determination in step S110 is "YES" indicating that the vehicle is a CVT vehicle, the flow proceeds to step S124.

Figure 9:
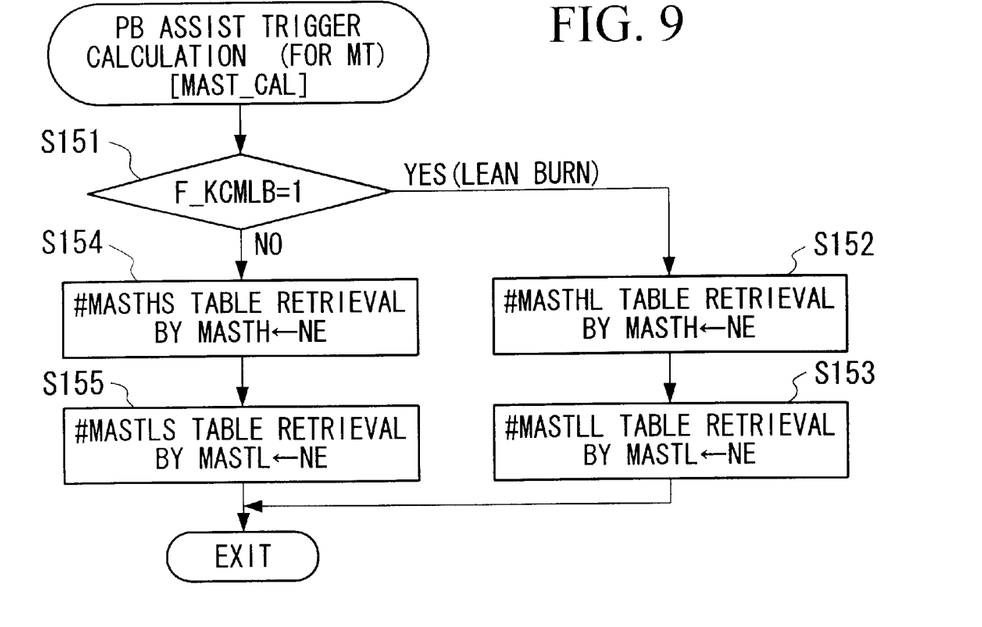
FIG. 9 shows a flowchart for calculating the PB assist trigger for a MT vehicle of the present invention.

In the subroutine flow of step S112, an air intake passage pressure assist trigger for the MT vehicle is calculated.

Figure 11:
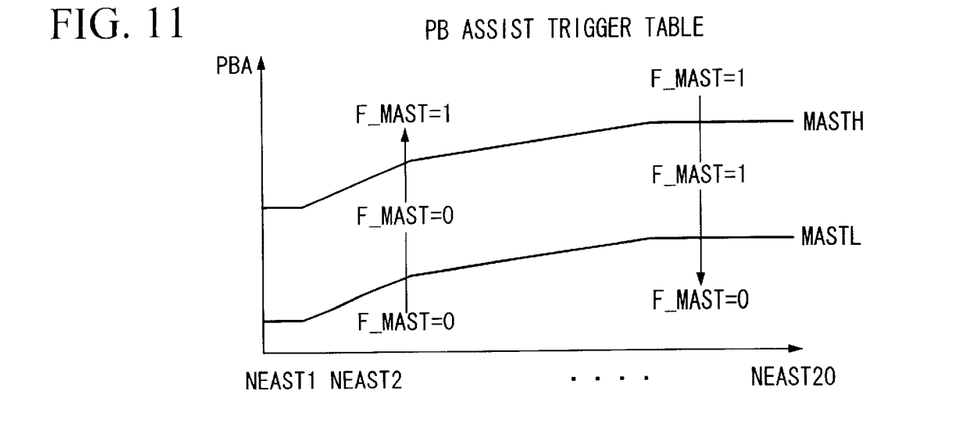
FIG. 11 is a graph showing the threshold values of a MT vehicle in the PB assist mode of the present invention.

The air intake passage pressure assist trigger table, which is referred to in this subroutine is, as shown by two solid lines in FIG. 11, defines an upper air intake passage pressure assist trigger threshold value MASTH and a low air intake passage pressure assist trigger threshold value MASTL for determining depending on the engine rotational speed NE whether the motor assist is performed. These two threshold values MASTH and MASTL are alternatively selected depending on whether the vehicle is in the stoichiometric or the lean burn state.

In this subroutine, in step S151, it is determined whether the lean burn determination flag F_KCMLB is "1". When the determination is "YES", indicating that the engine is in the lean burn state, an air intake passage pressure assist trigger threshold value MASTL/H is obtained referring to an intake passage pressure assist trigger table for the lean burn state.

Concretely, in step S152, the upper air intake passage pressure assist trigger threshold value MASTH is obtained by substituting the threshold value #MASTHL obtained by the table retrieval based on the engine rotational speed NE, and in the subsequent step S153, the lower air intake passage pressure assist trigger threshold value MASTL is obtained by substituting the threshold value #MASTLL obtained by substituting the table retrieval based on the engine rotational speed NE, and the program is completed.

When the determination in step S151 is "NO", indicating that the engine is not in the lean burn state, a threshold value MASTL/H of the air intake passage pressure assist trigger is obtained by table retrieving the air intake passage pressure assist trigger table for the stoichiometric burn state.

Concretely, in step S154, the threshold value #MASTHS obtained by the table retrieval based on the engine rotational speed NE is substituted for the upper air intake passage pressure assist trigger threshold value MASTH, and in the subsequent step S155, the threshold value #MASTLS obtained by the table retrieval based on the engine rotational speed NE is substituted for the lower air intake passage pressure assist trigger threshold value MASTL, and the program is completed.

It is noted that, in this subroutine, when the air intake passage pressure PBA, as it is increased or as the engine rotational speed NE is decreased, crosses the upper threshold value line MASTH from the lower area to the upper area as shown in FIG. 11, the motor assist determination flag F_MAST is switched from "0" to "1". When the air intake passage pressure PBA, as it is decreased or as the engine rotational speed NE is increased, crosses the lower threshold value line MASTHL from the upper area to the lower area, the motor assist determination flag F_MAST is switched from "1" to "0".

In the subsequent step S113, it is determined whether the motor assist determination flag F_MAST is "1", and when the determination is "1", the flow proceeds to step S114. In contrast, when the determination is not "1", the flow proceeds to step S115. In step S114, the air intake passage pressure assist trigger threshold value MAST is calculated as an additional value of a prescribed PB assist trigger correction value DPBAST to the lower air intake passage pressure assist trigger threshold value MASTL obtained by retrieval in step S112. In step S116, it is determined whether the present PBA value of the air intake passage pressure is equal to or greater than the air intake passage pressure assist trigger threshold value MAST. When the determination is "YES", the flow proceeds to step S134. When the determination is "NO", the flow proceeds to step S119. In addition, in step S115, the air intake passage pressure assist trigger threshold value MAST is calculated as an additional value of the prescribed PB assist trigger correction value DPBAST to the upper threshold value MASTH of the air intake passage pressure assist trigger, and the flow proceeds to step S116.

Figure 12:
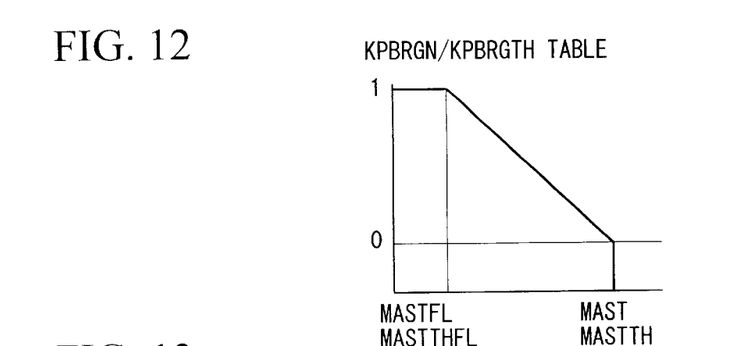
FIG. 12 is a graph for executing calculations in steps S120 and S132 of the present invention.

Subsequently, in step S119, a final air intake passage pressure assist trigger lower limit threshold value MASTFL is obtained by subtracting a prescribed delta value #DCRSPB (for example, 100 mm Hg) of the final air intake passage pressure assist trigger from the above-described air intake passage pressure assist trigger threshold value MAST. Subsequently, in step S120, a cruise charge amount subtraction coefficient table value KPBRGN is obtained by interpolating the final air intake passage pressure assist trigger lower limit threshold value MASTFL and the air intake passage pressure assist trigger threshold value MAST by the present value PBA of the air intake passage pressure as shown in FIG. 12, and in step S121, the cruise charge amount subtraction coefficient KTRGRGN is substituted by the cruise charge amount subtraction coefficient table value KPBRGN. Subsequently, in step S122, the motor assist determination flag F_MAST is set to "0" and the flow is returned.

In a subroutine (FIG. 10) in the step S124, an air intake passage pressure assist trigger for CVT vehicles is calculated.

Figure 13:
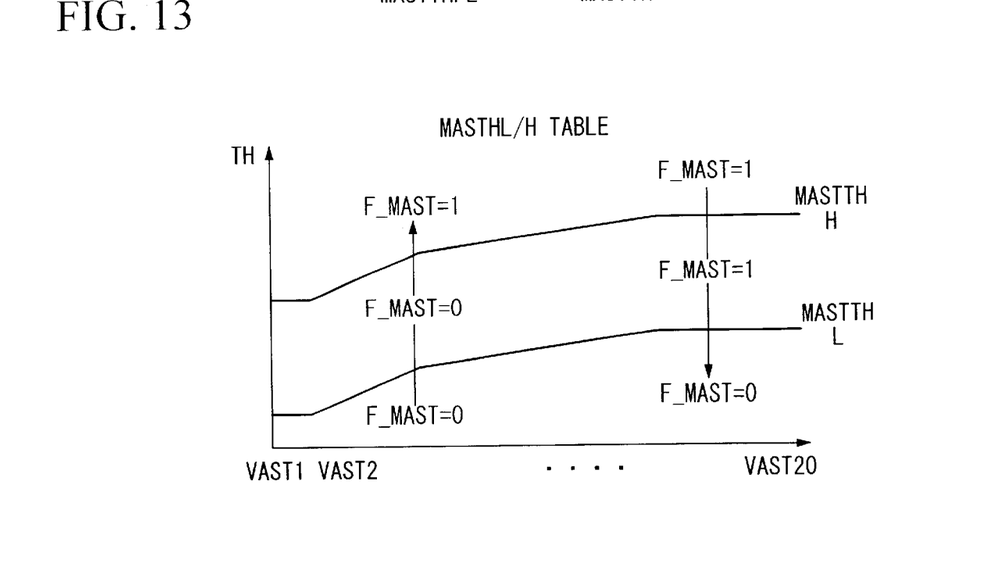
FIG. 13 is a graph showing the threshold values for the CVT vehicle in the PB assist mode of the present invention.

The trigger table, shown by two solid lines in FIG. 13 and which is referred to in this subroutine, defines, for an engine control vehicle speed VP, an upper air intake passage pressure assist trigger threshold value MASTTHH and a lower air intake passage pressure assist trigger threshold value MASTTHL for determining whether the motor assist is required. These two values are alternatively referred to depending upon whether the vehicle is in the stoichiometric burn or the lean burn state.

Figure 10:
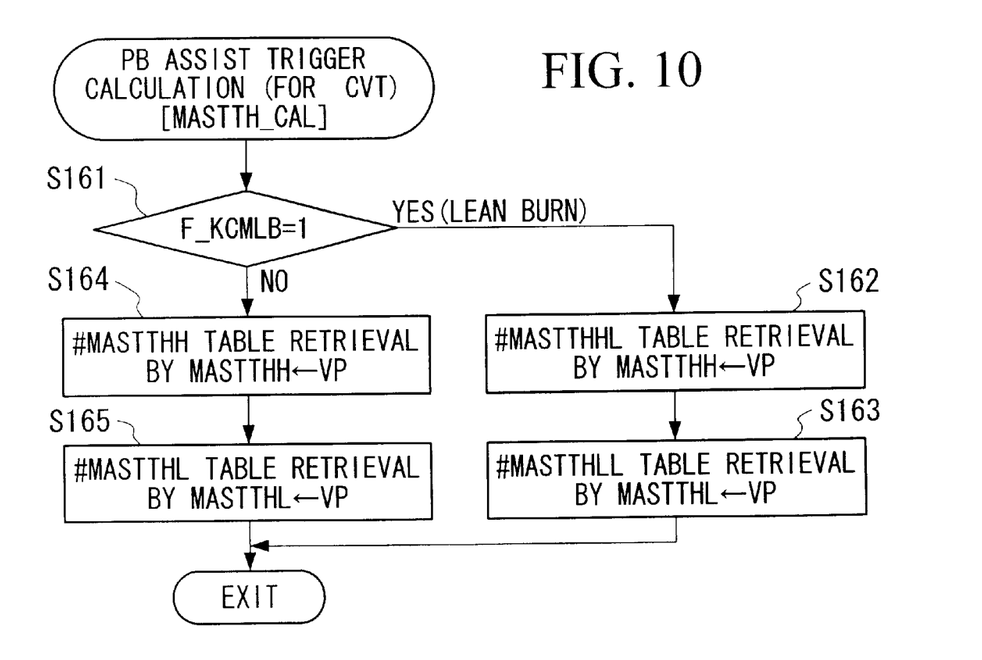
FIG. 10 shows a flowchart for calculating the PB assist trigger for a CVT vehicle of the present invention.

In this subroutine, first in step S161, it is determined whether the lean burn determination flag F_KCMLB is "1". When the determination is "YES", that is, when the vehicle is in the lean burn state, the thrshold value MASTHL/H of the air intake passage pressure assist trigger is obtained by retrieving the air intake passage pressure assist trigger table for the lean burn state.

Concretely, in step S162, the upper air intake passage pressure assist trigger threshold vale MASTHH is obtained by substituting the threshold value #MASTTHHL obtained by the table retrieval from the engine control vehicle speed VP, and the lower air intake passage pressure assist trigger threshold vale MASTHL is obtained by substituting the threshold value #MASTTHLL obtained by the table retrieval from the engine control vehicle speed VP, and the program is completed.

When the determination in step S161 is "NO", that is, when the vehicle is not in the lean burn state, a threshold value MASTHL/H is obtained by the table retrieval of the air intake passage pressure assist trigger table for the stoichiometric burn.

Concretely, in step S164, the threshold value MASTTHH of the upper air intake passage pressure assist trigger is obtained by substituting the threshold value #MASTTHH obtained by the table retrieval based on the engine control vehicle speed, and the threshold value MASTTHL of the lower air intake passage pressure assist trigger is obtained by substituting the threshold value #MASTTHL obtained by the table retrieval based on the engine control vehicle speed, and the program is completed.

It is noted that, in this subroutine, when the opening of the throttle TH, as it is increased or as the engine rotational speed NE is decreased, crosses the upper threshold value line MASTTH from the lower area to the upper area as shown in FIG. 13, the motor assist determination flag F_MAST is switched from "0" to "1". When the opening of the throttle TH, as it is decreased or as the engine rotational speed NE is increased, crosses the lower threshold value line MASTHL from the upper area to the lower area, the motor assist determination flag F_MAST is switched from "1" to "0".

In step S125, it is determined whether the motor assist determination flag F_MAST is "1". When the determination is not "1", the flow proceeds to step S126, and when the determination is "1", the flow proceeds to step S127. In step S126, a prescribed PB assist trigger correction value is obtained by subtracting the lower threshold MASTTHL of the air intake passage pressure assist trigger obtained by the table retrieval in step S124 from the air intake passage pressure assist trigger threshold value MASTTH, and in step S128, it is determined whether the present value THEM of the opening of the throttle is equal to or greater than the air intake passage pressure assist trigger threshold value MASTTH. If the determination is "NO", the flow proceeds to step S131. In step S127, the upper air intake passage pressure assist trigger threshold value MASTTHH and the prescribed PB assist trigger correction value DPBASTTH are added to the air intake passage pressure assist trigger threshold value MASTTH, and the flow proceeds to step S128.

Subsequently, in step S131, as shown in FIG. 131, a prescribed delta value #DCRSTHV of the opening of the throttle is subtracted from the above-described air intake pressure assist trigger threshold value MASTTH for obtaining the final air intake passage pressure assist trigger lower limit threshold value MASTTHFL. In step S132, the cruise charge amount subtraction table value KPBRGTH is obtained by interpolating the final air intake passage pressure assist trigger lower limit threshold value MASTTHFL and the air intake passage pressure assist trigger lower limit threshold value MASTTHFL using the present value of the opening of the throttle THEM, as shown in FIG. 12, and in step S133, the cruise charge amount subtraction coefficient KTRGRGN is obtained by substituting the cruise charge amount subtraction coefficient table value KPBRGTH. In step S122, the motor assist determination flag is set to "0" and the flow returns.

[Cruise Mode]

Next, the cruise mode will be described with reference to FIGS. 14 to 18.

Figure 14:
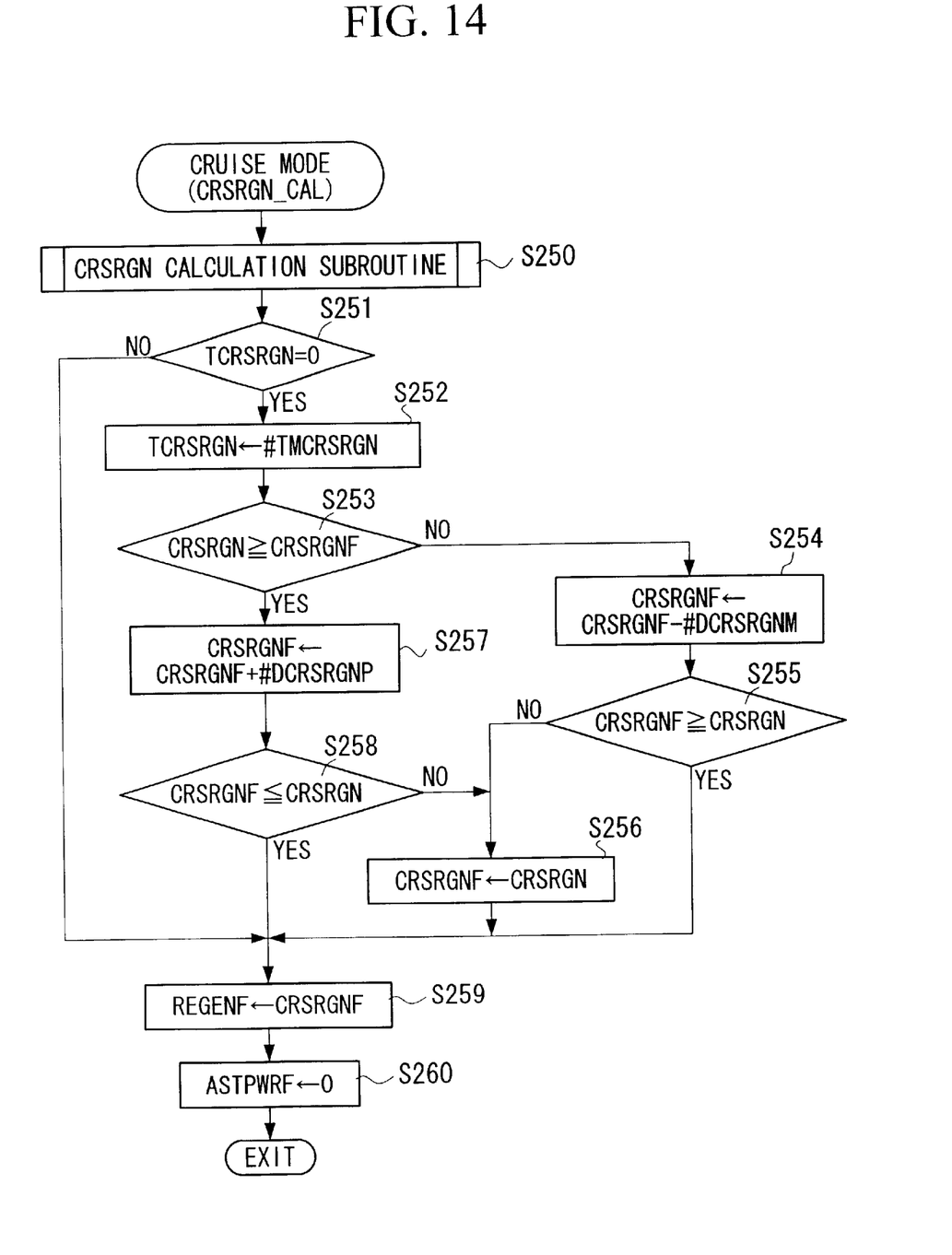
FIG. 14 shows a main flowchart of the cruise mode of the present invention.

First, in step S250, cruise charge amount calculation processing is executed which is described later in FIGS. 15 and 16. The flow proceeds to step S251, wherein it is determined whether a gradual addition subtraction timer TCRSRGN is "0". When the determination is "NO", the final cruise charge amount CRSRGNF is set to the final charge command value REGENF in step S259, the final assist command value ASTWRF is set to "0" in step S260, and the program is completed.

When the determination in step S251 is "YES", the gradual addition subtraction timer TCRSRGN is set to a prescribed value #TMCRSRGN and the flow proceeds to step S253. In step S253, it is determined whether the cruise charge amount CRSRGN is equal to or greater than the final cruise charge amount CRSRGNF.

When the determination in step S253 is "YES", a gradual addition value #DCRSRGN is added gradually to the final cruise charge amount CRSRGNF in step S157, and in step S258, it is determined again in step 258 whether the cruise charge amount CRSRGN is equal to or greater than the final cruise charge amount CRSRGNF. When the determination in step S258 indicates that the cruise charge amount CRSRGN is equal to or greater than the final cruise charge amount CRSRGNF, the flow proceeds to step S259.

Figure 18:
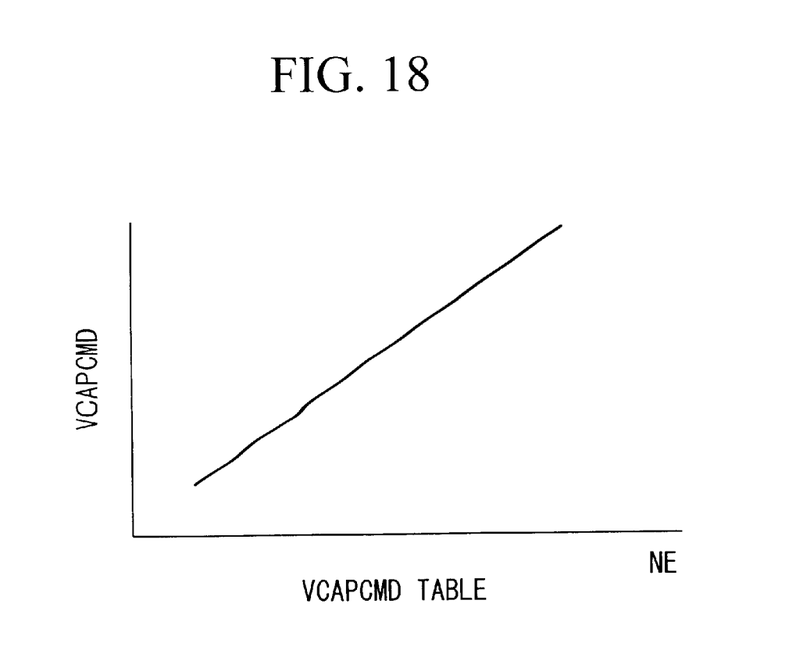
FIG. 18 shows a graph for retrieving a target capacitor voltage in response to the rotational speed of the engine.

Next, the cruise charge amount calculation subroutine in step S250 will be described with reference to FIGS. 15 and 16. First, in step S300 (target voltage setting device), a target capacitor voltage VCAPCMD is map retrieved. This map shows, as shown in FIG. 18, target capacitor voltage which changes in response to the engine rotational speed NE. In this map, the target capacitor voltage VCAPCMD is set to larger values than the counter electromotive voltage generated by the motor at an engine rotational speed NE.

As described above, the map is formed such that the target capacitor voltage VCAPCMD can be retrieved from the engine rotational speed NE. Since the present embodiment is related to a hybrid vehicle in which the output axes of both engine E and motor M are directly connected, the rotational number of the motor can be represented by the rotational speed NE of the engine.

Subsequently, the cruise charge amount CRSGRNM is map retrieved in step S302. The map shows a power generation amount determined in response to the engine rotational speed NE and the air intake passage pressure PBGA. Two maps are provided for the MT vehicle and the CVT vehicle, and either map is selected according to the vehicle type.

Subsequently, the flow proceeds to step S302, wherein it is determined whether the capacitor voltage VCAP exceeds a normal generation mode execution upper limit capacitor voltage VCAPH. When the determination is "YES", that is, when it is determined that the capacitor voltage VCAP is in the third region, the flow proceeds to step S323, and after the cruise charge amount CRSRGN is set to "0", the flow proceeds to step S328. In step S328, it is determined whether the final cruise charge command value CRSRGNF is "0". When the determination in step S328 indicates that the final cruise charge command value CRSRGNF is not "0", the flow proceeds to step S329, wherein the vehicle is shifted to the cruise charge stop mode, and the flow is completed. When the determination in step S328 indicates that the final cruise charge command value CRSRGNF is "0", the flow proceeds to step S330, wherein the vehicle is shifted to the cruise capacitor supply mode, and the flow is completed.

In this cruise capacitor supply mode, the auxiliary battery 4 is not charged by the generated voltage of motor M, but the auxiliary battery 4 is charged by supplying the storage voltage of the capacitor 3.

In the cruise capacitor mode, the motor does not supply its generated voltage to the auxiliary battery, but the storage voltage of the capacitor charges the auxiliary battery 4.

When the determination in step S302 is "NO", indicating that the capacitor voltage VCAP is not in the third region, the flow proceeds to step S303, wherein it is determined whether the capacitor voltage VCAP is below the forced generation execution voltage VCAPL. When the determination is "YES", that is, when the capacitor voltage VCAP is in the first region, the flow proceeds to step S304, wherein the cruise charge amount correction coefficient KCRSRGN is set to "1" (for forced generation mode), and further proceeds to step S316. When the determination in step S303 is "NO", indicating that the capacitor voltage VCAP is not in the first region, that is, the capacitor voltage VCAP is in the second region, the flow proceeds to step S311.

In step S311, it is determined whether then capacitor voltage is below the target capacitor voltage VCAPCMD obtained in step S300 by the map retrieval. When the determination is "YES", the flow proceeds to step S312, the cruise charge amount CRSRGN is obtained by substituting the cruise charge amount coefficient #KCRGN (for normal generation mode), and the flow proceeds to S314.

When the determination in step S311 is "NO", the flow proceeds to step S313, wherein it is determined whether a large current flag F_VELMAH is "0". When the determination is "YES", that is, when the current consumption by the 12V system is large, the flow proceeds to step S312. When the determination in step S313 is "NO", indicating that the current consumption is small, the flow proceeds to step S325, wherein the cruise charge amount CRSRGN is set to "0", and the flow proceeds to step S326.

In step S326, it is determined whether the engine rotational speed NE is equal to or below the cruise capacitor supply mode execution upper limit engine rotational speed #NDVSTP. When the determination is "NO", that is, when it is determined that the engine rotational speed NE>the cruise capacitor supply mode execution upper limit engine rotational speed #NDVSTP, the flow proceeds to step S329. It is noted that the cruise capacitor supply mode execution upper limit engine rotational speed #NDVSTP includes hysteresis.

When the determination in step S326 is "YES", that is, when it is determined that the engine rotational speed NE≦the cruise capacitor supply mode execution upper limit engine rotational speed #NDVSTP, the flow proceeds to step S327, wherein it is determined whether a downverter flag F_DV is "1". When the determination in step S327 is "YES", the flow proceeds to step S329. When, in contrast, the determination is "NO", the flow proceeds to step S328.

In step S314, it is determined whether the lean burn determination flag F_KCMLB is "1". When the determination is "YES", indicating that the vehicle is in the lean burn state, a correction coefficient KCRSRGN of the cruise charge amount is obtained by multiplication of the correction coefficient KCRSRGN of the cruise charge amount by the cruise charge amount coefficient #KCRGNLB (for lean burn generation mode), and the flow proceeds to step S316. When the determination in step S314 is "NO", indicating that the vehicle is not in the lean burn state, the flow also proceeds to S316.

Figure 16:
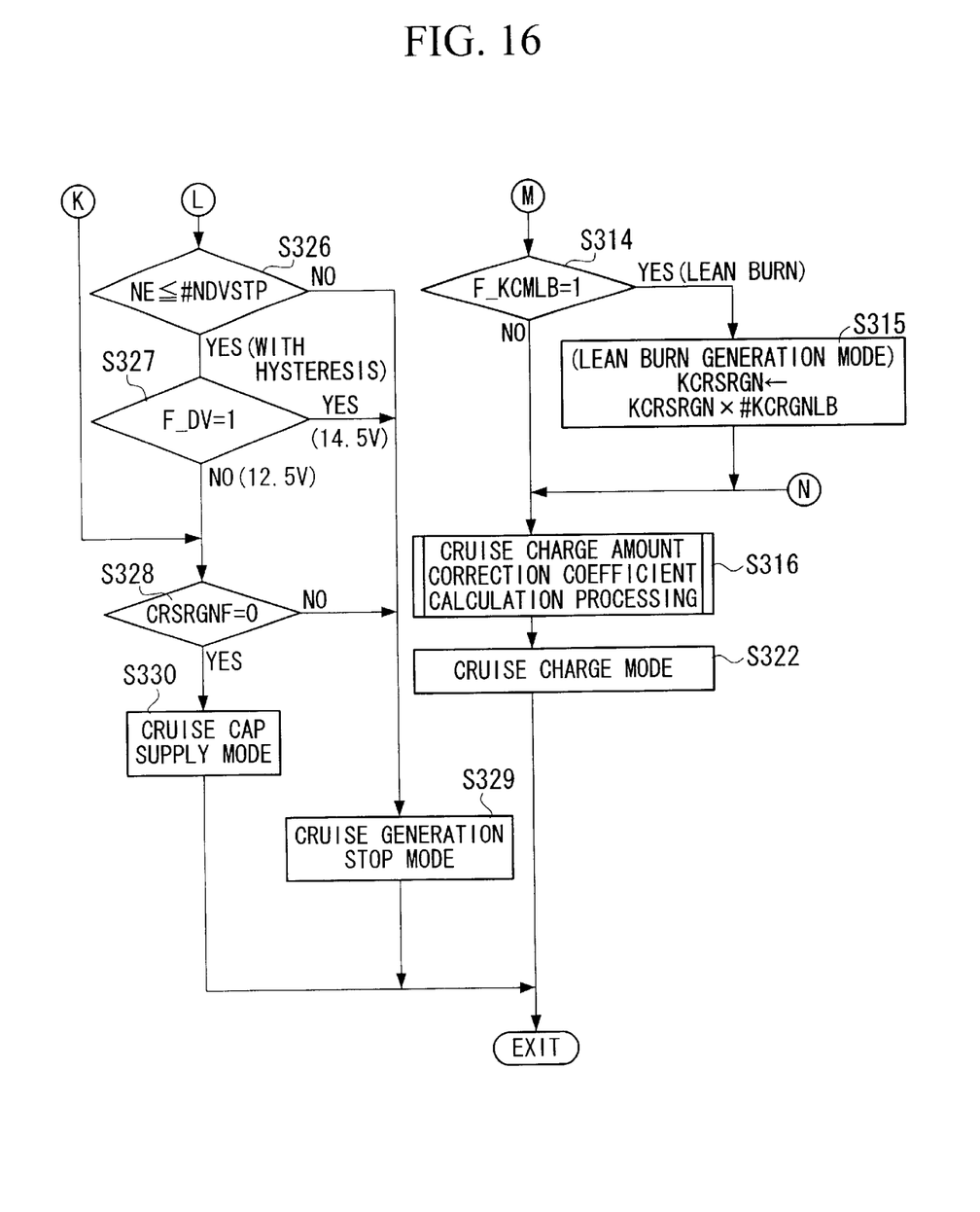
FIG. 16 is a flowchart showing the cruise charge amount calculation of the present invention.
Figure 17:
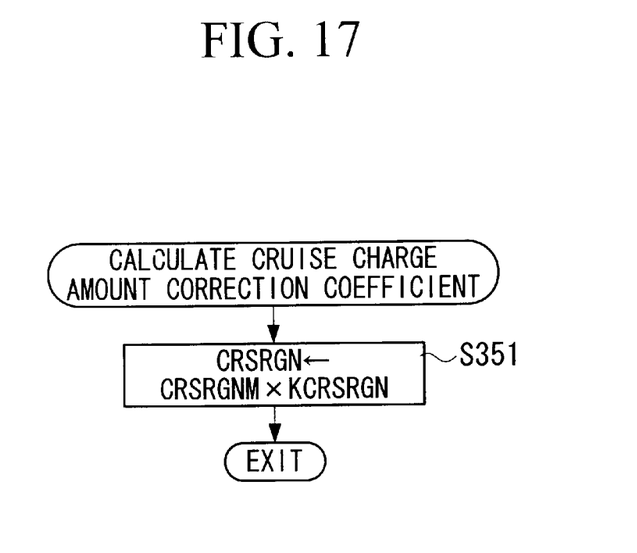
FIG. 17 is a flowchart showing the cruise charge amount correction coefficient calculation of the present invention.

In the cruise charge amount correction coefficient calculation subroutine shown in FIG. 17, in step S351, a cruise charge amount CRSRGN is obtained by multiplication of the map value CRSRGNM of the cruise charge amount (obtained in step S301) by the correction coefficient KCRSRGN of the cruise charge amount (obtained in FIGS. 15 and 16) and the program is completed.

Figure 15:
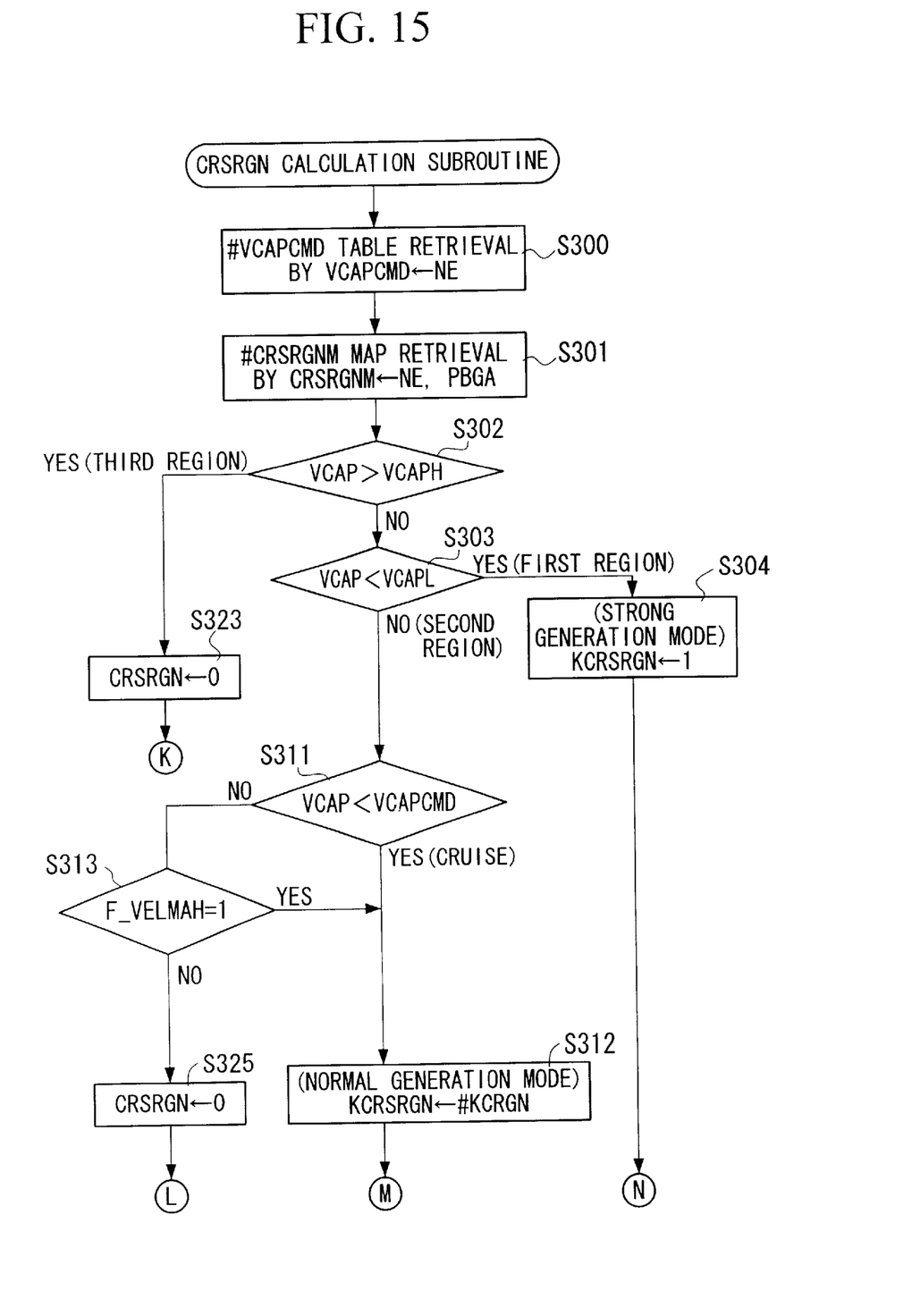
FIG. 15 is a flowchart showing the cruise charge amount calculation of the present invention.

In the present embodiment, as shown in FIGS. 15 and 16, the engine rotational speed NE associated with the motor M is detected by the engine rotational speed sensor S2, and the target capacitor voltage VCAPCMD corresponding to the charging target voltage of the capacitor 3 is set from the detected engine rotational speed NE. When the present value of the capacitor voltage VCAP is below the target capacitor voltage VCAPCMD, the capacitor 3 is charged such that the present capacitor voltage VCAP is increased to the target capacitor voltage VCAPCMD.

Accordingly, during cruising, when the engine rotational speed NE as well as the motor rotational number is large, the target capacitor voltage VCAPCMD is increased with the increase of the engine rotational speed NE so that the target capacitor voltage is set beyond the counter electromotive voltage of the motor. In contrast, when the present value of the capacitor voltage VCAP is below the target capacitor voltage VCAPCMD, the capacitor 3 is charged so that the capacitor voltage VCAP is maintained above the target capacitor voltage VCAPCMD, and then the number of instances of generating the counter electromotive voltage is reduced.

Because the present embodiment does not control the target capacitor charge based on kinetic energy related items such as the vehicle speed, the fuel consumption can be further reduced when the vehicles are driven at high speed on freeways or highways, although there is a possibility of causing the regeneration energy loss because of the saturated capacitor charge while deceleration. When the vehicle is driving at high speed while often running in the high speed cruising mode, the reduced fuel consumption obtained by the effect of the present embodiment is higher than the reduction in fuel consumption obtained by the effect of the deceleration regeneration by the motor assist running.

The present invention is not limited to the above-described embodiment and the concrete numerical values described above are not limiting but only shown as examples.

For example, in the above embodiment, although a parallel hybrid vehicle, in which the engine E and the motor M are directly connected, is used as an object among various parallel type hybrid vehicles, the present invention can be applied to the other types of hybrid vehicles, such a vehicle in which the output axes of the engine E and the motor M are connected indirectly through a clutch, the series-type hybrid vehicles, or to the vehicles which combine parallel-type and series-type structures. In the above-modified applications, the target capacitor voltage VCAPCMD is set from the engine rotational speed NE. It is a matter of course that, even in those modified applications; it is possible to set the target capacitor voltage based on the rotational number of the motor.

Regarding the storage device of the present invention, it is possible to use a battery in place of the capacitor 3. When the battery is used, a battery ECU (Electronic Control Unit) is connected to both the battery and the motor ECU in order to protect the battery and to calculate the state of charge (SOC) of the battery.

What is claimed is:

1. A control system for a hybrid vehicle with an engine and a motor, which are power sources, and a power storage unit for supplying electric power to the motor and for storing the electric power by regeneration, comprising:

a rotational number detecting device for detecting the rotational number associated with said motor;

a target voltage setting device for setting a charge target voltage of said power storage unit in response to the output of said rotational number detecting device;

a charge control device for controlling the charge of said power storage unit;

wherein said charge control device controls the charge of said power storage unit so that the charge of said power storage unit reaches said charge target voltage when a voltage of said power storage unit is below said charge target voltage, wherein said power storage unit is constituted by a capacitor comprising an electric double layer capacitor.

2. A control system of a hybrid vehicle according to claim 1, wherein said motor is disposed on the same driving shaft connecting between said engine and driving wheels for producing an assist driving force to assist the output from said engine or for producing energy by regeneration in response to the driving state of said vehicle and the charge state of the capacitor as said power storage unit, and, wherein when the vehicle is in a charge mode, in which, when said vehicle does not require the assistance of the driving power by said motor, the control system operates said motor as a power generator for charging said power storage unit, said charge control device controls the charge of said power storage unit such that the charge of said power storage unit reaches said charge target voltage.

3. A control system of a hybrid vehicle, according to claim 1, wherein when said vehicle travels in a cruising mode, and when the rotational speeds of the motor and the engine are high, the target capacitor voltage is increased as the rotation number increases so as to exceed the counter electromotive force by the motor; and wherein when the capacitor voltage at present is lower than the target capacitor voltage, the control system controls the motor to charge the capacitor rapidly.

* * * * *